April 16, 1963 K. J. TOMLINSON 3,085,407
COUPLING MEANS
Filed March 20, 1962

KENNETH J TOMLINSON
INVENTOR.

BY *Mason & Graham*

ATTORNEYS

United States Patent Office 3,085,407
Patented Apr. 16, 1963

3,085,407
COUPLING MEANS
Kenneth J. Tomlinson, Inglewood, Calif., assignor to Sprague Engineering Corporation, Gardena, Calif., a corporation of California
Filed Mar. 20, 1962, Ser. No. 181,043
8 Claims. (Cl. 64—6)

This invention has to do with means for coupling two shafts or the like to enable transmission of power or torque from one shaft to the other without any mechanical connection betwen the two.

There are many instances where power must be transmitted from one shaft to another without any mechanical connection between the shafts, as for example, through a wall forming parts of a housing, tank or enclosure. I am aware that heretofore power transmission or coupling devices have been provided wherein a multiple annular permanent magnet is provided on the drive shaft on one side of the casing wall and a complementary magnet provided on the driven shaft on the other side of the casing wall. However, this type of drive has proved unsatisfactory under certain operating conditions. For example, in hermetically sealed refrigerator compressors where the pressure in the sealed casing requires a relatively thick wall between the two magnetic elements of the coupling, the breakdown torque of the device is low. Breakdown torque occurs when, due to increasing load, the driven magnet lags behind the driving magnet to such an extent that poles of like polarity oppose one another thereby reducing the effective flux density across the gap to a point where driving torque is reduced to zero and there is a complete failure of power transmission. Also, if the driven load generates impulses such as may result from operation of a piston type compressor, oscillations are set up which contribute to a lower breakdown torque.

I am also aware that efforts have been made to utilize an induction rotor or eddy current disk on one shaft and a permanent magnet on the other shaft in order to provide for some torque being developed at all times irrespective of lag or slippage. However, normal running torque and stalling torque have proved too low for most applications where a large gap exists.

It therefore is an object of the present invention to provide a coupling means or power transmission device having no mechanical connection between the driving and driven members which overcomes the above-noted disadvantages of previously known devices and has certain inherent advantages.

More particularly it is an object to provide a coupling using an induction disk or member and providing means for improving the torque transmission characteristics by providing novel means for increasing the flux density across the gap between the driving and driven members. A particular object is to provide such a coupling means which has great flexibility and is adaptable to a wide variety of installations and conditions.

A further object is to provide a simple construction which is relatively inexpensive and requires little or no maintenance. These and other objects will be apparent from the drawing and the following description. Referring to the drawing.

Figures 1, 2:
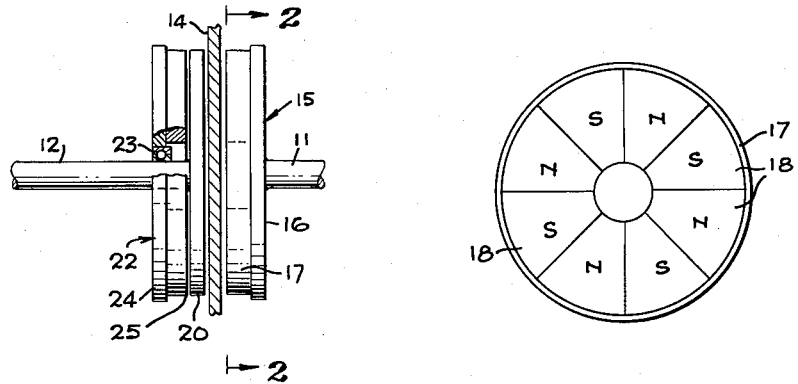
FIG. 1 is an elevational view of a coupling means or power transmission means embodying the invention, the view being somewhat diagrammatic and broken away to show a portion in section.
FIG. 2 is an elevational view on line 2—2 of FIG. 1.
Figure 3:
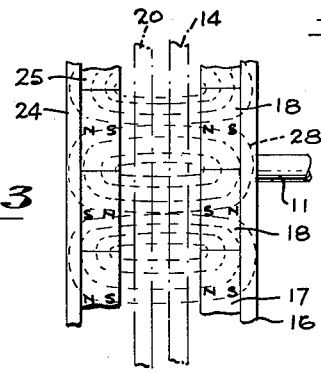
FIG. 3 is a diagrammatic view of a portion of the coupling in an expanded form.

More particularly describing the invention in FIG. 1 I show a coupling means or power transmission means which comprises a first shaft 11 and a second shaft 12 which is in axial alignment therewith. Either of these may be considered as being a powered drive shaft and the other considered as being the driven shaft. Between the shafts is shown a wall 14 which is formed of a nonmagnetic, nonmetallic material, such as a plastics suitable for a particular installation, and this may be considered to be the wall of a hermetically sealed casing or the like through which it is desired to transmit power. Mounted on the end of the first shaft is a permanent magnet element 15. This is shown as comprising a steel disk 16 which is fixed to the shaft 11 and an annular magnet 17 on the face thereof. The permanent magnet may comprise a series of individual magnets or it may consist of a single ring of material which is magnetically polarized to provide a plurality of radial areas or sections 18. On either side of the magnet adjacent sections 18 are alternately polarized as indicated by the north (N) and south (S) designations appearing thereon in FIGS. 2 and 3 of the drawing.

The other shaft 12 is provided with a metal disk 20 fixed thereto and opposing or facing the magnet element 15 of the shaft 11. The disk is of a conductive, nonmagnetic metal such as known to be suitable for use in permitting the disk to serve as an induction disk or eddy current device. By way of example, it may be made of copper. While the device will function with just the parts so far described, the torque characteristics of the device are not as satisfactory as could be desired and therefore in order to greatly improve the torque characteristics I provide a second magnet element, designated 22. This element is mounted for rotation about the axis of the shafts and for convenience may be mounted for rotation upon shaft 12 by means of a bearing 23 interposed between the parts. The magnet element 22 is complementary to the magnet element previously described and may be of the same construction, that is, comprise a backing plate 24 of steel, or the like, with a ring or annular magnet 25 on its face. Thus it will be apparent that the second magnet member is free to rotate independently of all other portions of the coupling and thus it can follow the rotation of the first magnet element at all times irrespective of the loading of the coupling and irrespective of slippage or relative movement between the two shafts.

As previously indicated, the magnet rings 17 and 25 are made up of a plurality of sections (or independent magnets if desired) which are alternately oppositely polarized. Thus, referring to FIG. 3, which is a diagrammatic edge view of a portion of the two magnet elements 15 and 22 as if they were laid out straight rather than in their curved annular form, it will be seen that each section 18 has a given polarity on the side thereof facing the other magnet element while the corresponding portions of the adjacent sections 18 have an opposite polarity. In operation, the magnet element 22, which is free to rotate independently aligns itself with the magnet element 15 so that the sections 18 of magnet 22 are opposite sections 18 of magnet 22 having the oposite polarity. Thus with this ararngement relatively dense and regular magnetic fields with closed paths for the lines of flux extend between the two magnets and through the intermediate induction disk 20. The fields are diagrammatically indicated by broken lines 28 representing magnetic flux paths. The steel plates 16 and 24 provide a path for the flux on the outer sides of the coupling. The fields are maintained at maximum strength by the ability of the magnet member 22 to follow and maintain its relative position with respect to magnet 15, thereby greatly increasing the effectiveness of the coupling and increasing breakdown torque.

Figure 4:
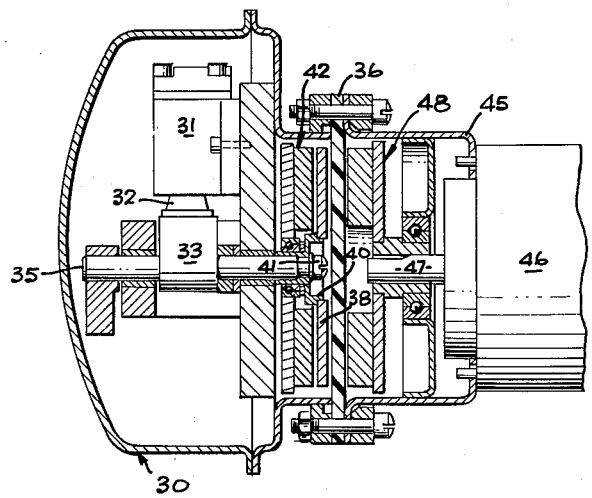
FIG. 4 is a sectional view through a motor-compressor unit showing the coupling means mounted therein.

Referring now to FIG. 4 which is illustrative of an installation embodying the invention, a housing 30 which may be hermetically sealed, is shown as having mounted within it a compressor 31 the piston 32 of which is driven by an eccentric portion 33 on a shaft 35. At the end of the housing there is provided a nonmagnetic, nonconductive wall 36 which may be made of a suitable plastics. The shaft 35, which in this instance may be considered the driven shaft, is shown provided with an induction disk 38 which is fixed thereto being mounted upon a sleeve 40 held by a screw 41. Rotatably mounted behind the disk is a magnet member 42 which may be of the same general type previously described.

On the outside of the casing 30 there is shown an adapter 45 which serves to support and mount a motor 46 having a drive shaft 47 which extends in alignment with the shaft 35. A magnet member 48 of the type previously described is fixedly mounted on the drive shaft 47. The operation of the device is the same as previously described.

Although I have shown and described a preferred form of my invention, I contemplate that various changes and modifications can be made without departing from the invention, the scope of which is indicated by the claims which follow.

I claim:

1. In an induction coupling means a drive shaft, a driven shaft in axial alignment with said drive shaft and spaced therefrom, a first permanent magnet means fixed to the end of one shaft, an induction disk fixed to the adjacent end of the other shaft, and a second permanent magnet means mounted for rotation independent of said shafts on the axis of said shafts and on the side of said disk removed from said first permanent magnet means, said first and second permanent magnet means being constructed and arranged to be complementary and, in at least one relative position, mutually attracted whereby to establish a magnetic field having a relatively regular and closed flux path through said induction disk.

2. The induction coupling means set forth in claim 1 in which said first and said second permanent magnet means each comprises a disk of magnetic metal in a plane normal to the axis of rotation of said shafts and a plurality of magnets disposed on one face thereof about the axis of rotation of the disk.

3. The induction coupling means set forth in claim 1 in which said first and said second permanent magnet means each comprises a disk of magnetic metal in a plane normal to the axis of rotation of said shafts having a plurality of magnets disposed on one face thereof about the axis of rotation of the disk, and in which said second permanent magnet means is mounted for rotation on said other shaft.

4. The induction coupling means set forth in claim 1 in which said first and said second permanent magnet means each comprises a disk of magnetic metal in a plane normal to the axis of rotation of said shafts having a plurality of magnets disposed on one face thereof about the axis of rotation of the disk, the polarity of said magnets being oppositely oriented alternately around said disk.

5. In means for transmitting mechanical power through a nonmetallic wall of a housing or the like, a rotatable inner shaft within said housing having an end adjacent said wall, an outer shaft mounted for rotation externally of said housing in alignment with said inner shaft and having an end adjacent said wall, a first permanent magnet means fixed to the end of one shaft, an induction disk fixed to the adjacent end of the other shaft, and a second permanent magnet means mounted for rotation independent of said shafts on the axis of said shafts and on the side of said disk removed from said first permanent magnet means, said first and second permanent magnet means being constructed and arranged to be complementary and, in at least one relative position, mutually attracted whereby to establish a magnetic field having a relatively regular closed flux path through said induction disk.

6. The induction coupling set forth in claim 1 in which said first and said second permanent magnet means each comprises a disk of magnetic metal in a plane normal to the axis of rotation of said shafts having a plurality of magnets disposed on one face thereof about the axis of rotation of the disk, the polarity of said magnets being oppositely oriented around said disk.

7. In a power transmission device, a driving member mounted for movement, a driven member mounted for movement to permit it to follow the movement of the driving member, a first magnet fixed to one of said members, a nonmagnetic metal induction element carried by the other of said members in spaced relation relative to said magnet, and a second magnet carried by said other of said members behind said induction element for free movement independent of said disk and said other member to enable the same to follow the movements of said first magnet, said first and second magnets being of opposite polarity on their adjacent faces when normally oriented.

8. An induction coupling, comprising a drive shaft, a driven shaft in axial alignment with said drive shaft, a fixed permanent magnet disk fixed to the end of one shaft, a nonmagnetic induction rotor disk fixed to the end of the other shaft and spaced from said fixed magnet disk, a freely rotatable magnet disk carried by said other shaft, and opposing said fixed magnet disk, said induction rotor disk being between said magnet disks, said magnet disks being complementary.

References Cited in the file of this patent

FOREIGN PATENTS 525,316    Canada _____ May 22, 1956